Dec. 20, 1938.  C. L. DALY  2,140,692
METHOD FOR MANUFACTURING MOLDED RUBBER ARTICLES
Original Filed Aug. 23, 1934
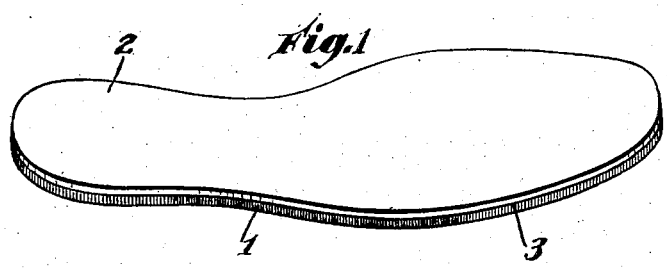
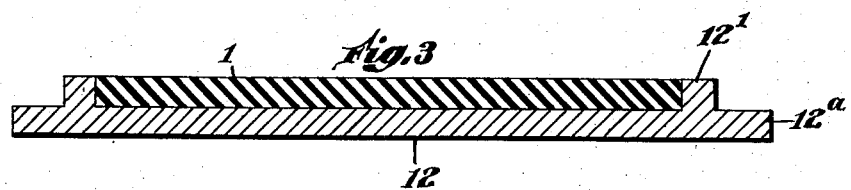
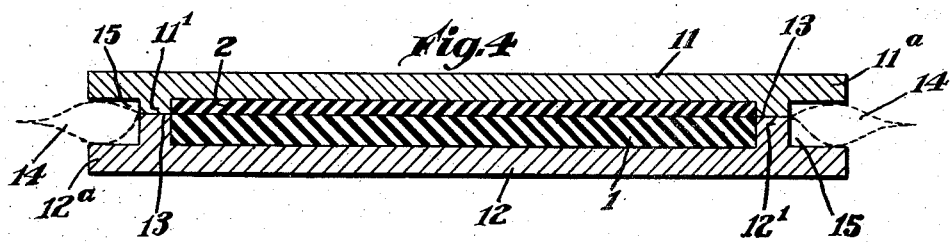
Inventor
Charles Leo Daly
By Attorney Patented Dec. 20, 1938

2,140,692

UNITED STATES PATENT OFFICE 2,140,692

METHOD FOR MANUFACTURING MOLDED RUBBER ARTICLES

Charles Leo Daly, Belmont, Mass., assignor to Daly Bros. Shoe Co., Inc., Boston, Mass., a corporation of Massachusetts Original application August 23, 1934, Serial No. 741,101. Divided and this application February 15, 1937, Serial No. 125,740

2 Claims. (Cl. 18—59)

This invention is a division of my prior application Serial No. 741,101, filed August 23, 1934, now Patent No. 2,104,583, issued Jan. 4, 1938 and relates to the method of manufacturing the molded rubber articles described and claimed therein.

As pointed out in said application, it is sometimes desirable, in the manufacture of shoes having molded rubber outer soles, to use a composite rubber sole consisting of at least two layers which differ in their characteristics.

Such differences may be a difference in color characteristic, or in physical characteristic, or in both. Typically, the layers may differ in their color characteristic. For example, one layer, usually the outer, may be the characteristic black color of rubber, in which event the other or inner layer will be of some contrasting color, as tan.

Heretofore in the molding of such composite rubber outer soles it has been impossible to obtain a clean, neat, sharp line of demarcation between the two layers of the composite rubber sole when vulcanized. Instead, the layers have tended to consolidate with each other along uneven, wavy or irregular lines. This detracts from the appearance of the sole and of the shoe to which the sole is attached.

The uneven, irregular and unsightly line of juncture between the two layers results from the method of molding the composite sole now generally followed. According to such method the two biscuits of differently colored rubber are superposed upon one another in the bottom member of the mold, the top mold member is placed thereover, and the sole vulcanized. During the vulcanization process, the two biscuits flow into one another. This produces an uneven and irregular line of juncture between the two layers of the vulcanized sole which greatly detracts from the appearance of the finished product.

In order to conceal this unsightly line, the usual practice is to paint over part of the lighter colored layer to match the darker colored layer and give the effect of a clean, sharp line of demarcation between the two differently colored layers. This is not only an "after" operation involving extra labor, time and expense, but requires some little skill as well.

The present invention contemplates a method and apparatus which will avoid the defects and disadvantages of the prior practice to the end that the composite rubber sole when vulcanized will have a clean, straight regular line of demarcation between the individual layers, thus materially enhancing the appearance of the shoe to which such sole is attached.

The apparatus for the practice of my invention comprises a two-part mold, each mold member having a marginal flange to abut the marginal flange of the coacting mold member when the mold is closed, and the flanges of the respective mold members defining with the body portion of the mold member of which it is a part an included recess for the reception of a biscuit or batch of vulcanizable rubber.

The first step in the practice of my invention, using such two-part mold, is to fill or substantially fill the recess of one mold member with a biscuit or layer of vulcanizable rubber of one characteristic, and to fill or substantially fill the recess of the coacting mold member with a layer or biscuit of vulcanizable rubber of different characteristic color. These individual layers may be of any desired thickness and of any desired color, or, instead of distinguishing from each other in point of color characteristic, they may distinguish from each other in point of physical characteristic.

However distinguished, the next step in the practice of my method of molding is to bring the two mold members together in molding relation and vulcanize the two layers together in face to face contact with each other as an integral article.

After vulcanization is completed, the mold is opened and the article removed.

My method eliminates the tendency during vulcanization for one layer to flow into the other. Instead, provision is made for one of the layers to overflow around the margin of the coacting mold members. Such marginal overflow is subsequently trimmed off, leaving as the physical line of demarcation between the consolidated layers a marginal fin or feather edge of extreme thinness constituted by the marginal overflow itself.

This fin or feather edge may afterwards be trimmed off substantially flush with the margin of the shoe sole. Whether trimmed off entirely or only in part, such fin defines a clean, sharp, definite line of demarcation at the juncture of the two layers. The marginal edge of the shoe sole is therefore an attractive edge and one wherein there is no necessity for subsequently painting or staining one of the layers in the effort to obtain a neat, clean edge as has heretofore been necessary in the art.

The method of the present invention may be practiced in the molding of rubber soles of any desired length, as full length soles, three-quarter soles, or half soles.

Various pattern effects of the contrastingly colored layers may be had. For example, the inner layer may be of a solid color throughout, as tan, and the outer layer of a contrasting color, as black. Or the contrasting color of the outer layer may be carried into and through the inner layer, as by extending it forwardly from the heel towards the toe between the margins of the sole so as to accentuate the contrast of the colors.

These and various other functional and constructional features of advantage are all secured in the method and by the apparatus of the present invention.

In the accompanying drawing I have shown for illustrative purposes a composite rubber shoe sole produced in accordance with and by the apparatus of my present invention, and have illustrated somewhat diagrammatically the successive steps of the method. In such drawings, the showing of the mold sections has purposely been made somewhat diagrammatic for the sake of clearness.

Fig. 1 is a perspective view of a composite molded rubber outer sole produced in accordance with and by the apparatus of the present invention, the sole being seen from the top or inner face thereof.

Figs. 2 and 3 are diagrammatic cross sectional views of the respective mold members within which the individual biscuits or batches of rubber of different characteristics are individually assembled for vulcanization when the mold members are brought together in molding relation as shown in Fig. 4, and Fig. 4 is a cross section showing the individual mold members brought together in vulcanizing relation and the individual biscuits vulcanized together as an integral article, the resultant overflow being indicated in the condition in which it exists before it is trimmed off to provide the ultimate sole illustrated in Fig. 1.

The composite rubber outer sole produced by the present invention consists of an outer layer 1 and an inner layer 2 vulcanized together to form an integral article which presents either entirely around its margin or around so much thereof as desired, a clean, straight well defined line or edge of demarcation 3 at the juncture of the consolidated layers 1 and 2.

The material of the layers 1 and 2 is vulcanizable rubber. The individual layers may be rubber of the same physical characteristics, but contrastingly colored, or the materials of the respective layers may be of different physical characteristics.

For the purposes of this application the inner layer 2 may be considered to be rubber containing as an ingredient a coloring pigment which will impart a light or tan colored appearance thereto in contrast to the normal dark or black appearance of the outer layer 1. Obviously, of course, other contrasting color combinations may be employed, and, of course, the laminated sole may consist of more than two layers, if desired.

Such article is produced by the method and apparatus illustrated in Figs. 2, 3 and 4. Referring to these figures, a pair of complemental mold members 11 and 12 are provided each having an inset marginal flange 11$^1$ and 12$^1$ extending continuously around the mold sections, if the two tone color scheme is carried out throughout the entire area of the composite sole (see Fig. 1). The respective flanges 11$^1$ and 12$^1$ define recesses for the reception of batches or biscuits of rubber which are to be vulcanized together to form the integral laminated sole disclosed. Each pocket or recess of each mold member is of a depth sufficient to form an ultimate layer of the desired thickness in the final product.

As shown, the respective layers 1 and 2 are of different thicknesses, the top or inner layer 2 being thinner than the bottom or outer layer 1. This, however, is a matter of choice and the arrangement as to thickness may be reversed if desired, or the layers may be of the same thickness.

In practice, each pocket or recess of each mold member is filled with a batch or biscuit of vulcanizable rubber of the desired physical or color characteristic. For the purposes of this application the light or tan colored inner layer 2 may be considered as having been placed within the recess of the mold member 11 and the dark or black outer layer 1 as having been placed within the pocket or recess of the cooperating mold member 12.

The filled mold members 11 and 12 are then brought together in the relation illustrated in Fig. 4, and subjected to the heat of vulcanization. The individual batches or biscuits 1 and 2 overflow marginally about the confines of the mold at the region marked 13 in Fig. 4 which is the region at which the flanges 11$^1$ and 12$^1$ abut each other when the molds are reversed and brought together in the relation of Fig. 4. Such capacity for overflow prevents one batch from flowing into or commingling with the other batch, the overflowing material at the margin of the mold members overflowing as at 14 into the spaces 15 separating the marginal extensions 11$^a$ and 12$^a$ of the respective mold members and subsequently being trimmed off.

When the mold members are separated and the vulcanized composite outer sole removed therefrom, it will be found that the only perceptible line of demarcation between the consolidated layers 1 and 2 is a marginal fin or feather edge heretofore designated as 3 in this description. Such fin or feather edge is extremely thin and constitutes a distinct line of cleavage or demarcation between the two layers. Although originally as long as the width of the flanges 11$^1$ and 12$^1$, it may in practice be trimmed back to the edge of the composite sole when the overflow 14 is trimmed off. The fin itself is constituted by whichever of the two batches overflowed when the mold members were brought into the relation of Fig. 4 and the heat of vulcanization applied and is usually constituted by the upper or inner layer 2.

While the present invention has been shown and described in its adaptation to the molding of a composite outer sole, this treatment is purely illustrative and in no way limiting. Obviously other articles, as rubber heels, may be similarly molded.

Various modifications in method and apparatus may be resorted to within the spirit and scope of this invention as defined by the appended claims.

What I therefore claim and desire to secure by Letters Patent is:—

1. The method of uniting two layers of vulcanizable material into a composite molded article, which comprises separately confining preformed biscuits of different physical and optical properties within the mold cavities of separate mold members, at least one of said biscuits being of greater mass than required to exactly fill the mold cavity in which it is confined reversing one mold member and superposing it upon the other mold member with the biscuits in over-all surface contact, pressing both mold members in a direction substantially normal to the plane of surface contact whereby excess material in the mold cavities will be expressed as a flash and the remaining material in each cavity will exactly fill that cavity, and vulcanizing said biscuits together while maintaining said pressure in said direction thereon so that the final article will have a clean, straight well-defined line of demarcation between the layers thereof.

2. The method of uniting two layers of vulcanizable rubber into a composite molded shoe sole, which comprises placing preformed biscuits of different physical and optical properties within the mold cavities of separate mold members, at least one of said biscuits being of greater mass than required to exactly fill the mold cavity in which it is confined reversing one mold member and superposing it upon the other mold member with the biscuits in over-all surface contact, pressing both mold members in a direction substantially normal to the plane of surface contact whereby excess material in the mold cavities will be expressed as a flash and the remaining material in each cavity will exactly fill that cavity, vulcanizing said biscuits together while maintaining said pressure in said direction thereon so that the final article will have a clean, straight, well-defined line of demarcation between the layers thereof, which line of demarcation is in the plane of the parting line of the mold members, and in finally separating the mold members, removing the shoe sole, and trimming off the overflowed flash.

CHARLES L. DALY.